United States Patent [19]

Yada et al.

[11] Patent Number: 5,558,828
[45] Date of Patent: Sep. 24, 1996

[54] METHOD OF MOUNTING A TRIM MEMBER ON A FLANGE OF A PANEL

[75] Inventors: Yukihiko Yada; Takeaki Niwa, both of Obu, Japan

[73] Assignee: Tokai Kogyo Kabushiki Kaisha, Japan

[21] Appl. No.: 416,707

[22] PCT Filed: Aug. 14, 1994

[86] PCT No.: PCT/JP94/01348

§ 371 Date: Apr. 17, 1995

§ 102(e) Date: Apr. 17, 1995

[87] PCT Pub. No.: WO95/05931

PCT Pub. Date: Mar. 2, 1995

[30] Foreign Application Priority Data

Aug. 23, 1993 [JP] Japan .................................. 5-2907707
Jun. 2, 1994 [JP] Japan .................................. 6-121457

[51] Int. Cl.$^6$ .................................................. B29C 47/02
[52] U.S. Cl. ............... 264/252; 156/244.12; 156/244.27; 264/40.5; 264/171.24; 264/177.20; 425/113
[58] Field of Search ............................. 264/252, 171.15, 264/177.16–177.20, 40.5, 171.24; 156/244.12, 107–108:244.27; 425/113

[56] References Cited

U.S. PATENT DOCUMENTS

| | | | |
|---|---|---|---|
| 3,491,176 | 1/1970 | Wahlstrom | 264/252 |
| 4,519,962 | 5/1985 | Schlienkamp | 264/40.7 |
| 4,859,391 | 8/1989 | Jackson | 264/171.15 |
| 5,362,428 | 11/1994 | Tsujino et al. | 156/107 |
| 5,385,703 | 1/1995 | Shanok et al. | 264/177.2 |

FOREIGN PATENT DOCUMENTS 59-152810  8/1984  Japan .................................. 264/177.1

*Primary Examiner*—Jeffery R. Thurlow
*Attorney, Agent, or Firm*—Dennison, Meserole, Pollack & Scheiner

[57] ABSTRACT

A flange of a panel is inserted into an extrusion port of an extrusion molding die through an insertion slit which opens laterally of the extrusion port to thereby form between the extrusion port and the flange a molding space which corresponds to a trim member. A material for a trim member is extruded forwardly of the extrusion port through the molding space, and the die and the flange are moved relatively to each other while adjusting the amount of insertion of the flange into the extrusion port so that a distance between a reference position on the panel and the trim member is maintained at a constant distance. Thus, a trim member is extrusion molded on the edge of the flange of the panel and is mounted thereon simultaneously and yet accurately in a desired outer shape.

2 Claims, 9 Drawing Sheets

METHOD OF MOUNTING A TRIM MEMBER ON A FLANGE OF A PANEL

TECHNICAL FIELD

The present invention relates to a method of mounting a trim member on a flange of a panel, such as a door panel or a panel forming a wheel arch section, for a vehicle.

BACKGROUND OF THE INVENTION

Conventionally, when a panel is constructed as a door panel 1' for a vehicle, as shown in FIG. 8, a first flange 3' formed on the upper edge of an inner panel 2' and a second flange 5' formed on the upper edge of an outer panel 4' are joined by spot welding 7'. Then, as shown in FIGS. 9(A) and 9(B), a trim member (called weatherstrip, molding or welt) 11' is mounted on the edges (upper ends) of the joined first and second flanges 3' and 5' as the latter flanges 3' and 5' are inserted into an insertion groove formed on the trim member 11'.

Such a trim member 11' is disclosed in Japanese Laid-Open Patent Publication No. 2-68240, for example.

When the first flange 3' of the inner panel 2' is joined to the second flange 5' of the outer panel 4', the joined flanges 3' and 5' may sometimes be joined with their position shifted in a vertical direction, as shown in FIG. 8, or the joined flanges 3' and 5' may sometimes be joined with their upper ends partly opened, as shown in FIG. 10.

When the first and the second flanges 3' and 5' are joined with their position shifted in a vertical direction as shown in FIG. 8, in the mounting position shown in FIG. 9(B) where the upper ends of the joined flanges 3' and 5' are inserted into the trim member 11', a distance H' required between a reference position of the door panel 1', such as a center P' of a through hole 6 formed through the outer panel 4', and the upper edge of the trim member 11' is increased by the amount L' corresponding to the above-noted shift of position. As a result, there arise problems that the trim member 11' is mounted obliquely relative to the upper edge of the joined flanges 3' and 5', or that the trim member 11' interferes with other parts assembled therearound, such as a door glass.

When the flanges 3' and 5' are joined with the upper ends partly opened, as shown in FIGS. 10 and 11, it is difficult to insert the upper ends of the flanges 3' and 5' into the trim member 11', and additionally, the insertion groove of the trim member 11' remains open, thus impairing appearance of the mounted trim member 11'.

In case of a panel 101' forming a wheel arch section for a vehicle, as shown in FIGS. 12 and 13(A) to 13(C), a flange 103' formed by bending the panel 101' along the wheel arch section is inserted into an insertion groove formed on a trim member 111'. In this case, the distance from the bend to the edge of the flange 103' tends to vary to be slightly larger or smaller than a normal distance S, or the bending angle tends to vary to be larger or smaller than a normal angle θ. As a result, the trim member 111' cannot be mounted in a desired condition, and appearance of the mounted trim member 111' is impaired.

DISCLOSURE OF THE INVENTION

In view of the above-noted problems, it is an object of the present invention to provide a method of mounting a trim member on a flange of a panel, in which the trim member can be mounted on the flange accurately with a desired outer shape.

The method of mounting a trim member on a flange of a panel according to the invention comprises the steps of preparing an extrusion molding die having a supply passage for supplying a molding material for a trim member, an extrusion port communicating with the supply passage and an insertion slit communicating with and extending laterally from the extrusion port for insertion of a flange of a panel, inserting the flange into the extrusion port through the insertion slit, thereby defining between the extrusion port and the flange a molding space which corresponds to the trim member, extruding the molding material supplied through the material supply passage forwardly of the extrusion port through the molding space, and providing continuous relative movement of the molding die and the flange, while adjusting the amount of insertion of the flange into the extrusion port such that the distance from a reference position of the panel to the trim member is maintained at a required distance.

Further, even in the case that the panel is a composite panel comprised of a plurality of panel sheets, the trim member is mounted on joined flanges of the composite panel by extrusion molding in the same manner as described above.

According to the above-mentioned method of mounting a trim member on a flange of a panel, the trim member is continuously extrusion molded along the edge of the flange and is simultaneously mounted on the flange.

As a result, even with a flange having a nonuniform width or a distorted edge, the trim member can be accurately mounted on the flange with a desired outer shape. Thus, it is possible to obtain a good appearance and to prevent coming-off or removal which may be caused from poor mounting of the trim member.

Further, in case of a composite panel, when flanges of each panel sheet are joined with their position shifted in a vertical direction, or when they are joined with the upper ends partly opened, the trim member can be accurately mounted on the flanges with a desired outer shape. Thus, it is possible to eliminate the problems that the trim member is mounted obliquely relative to the upper edge of the joined flanges, or that the trim member interferes with other parts assembled theraroud, such as a door glass.

BEST MODES OF EMBODYING THE INVENTION

First Embodiment

Now, a first embodiment of the invention will be described with reference to FIGS. 1 to 5.

Figure 3:
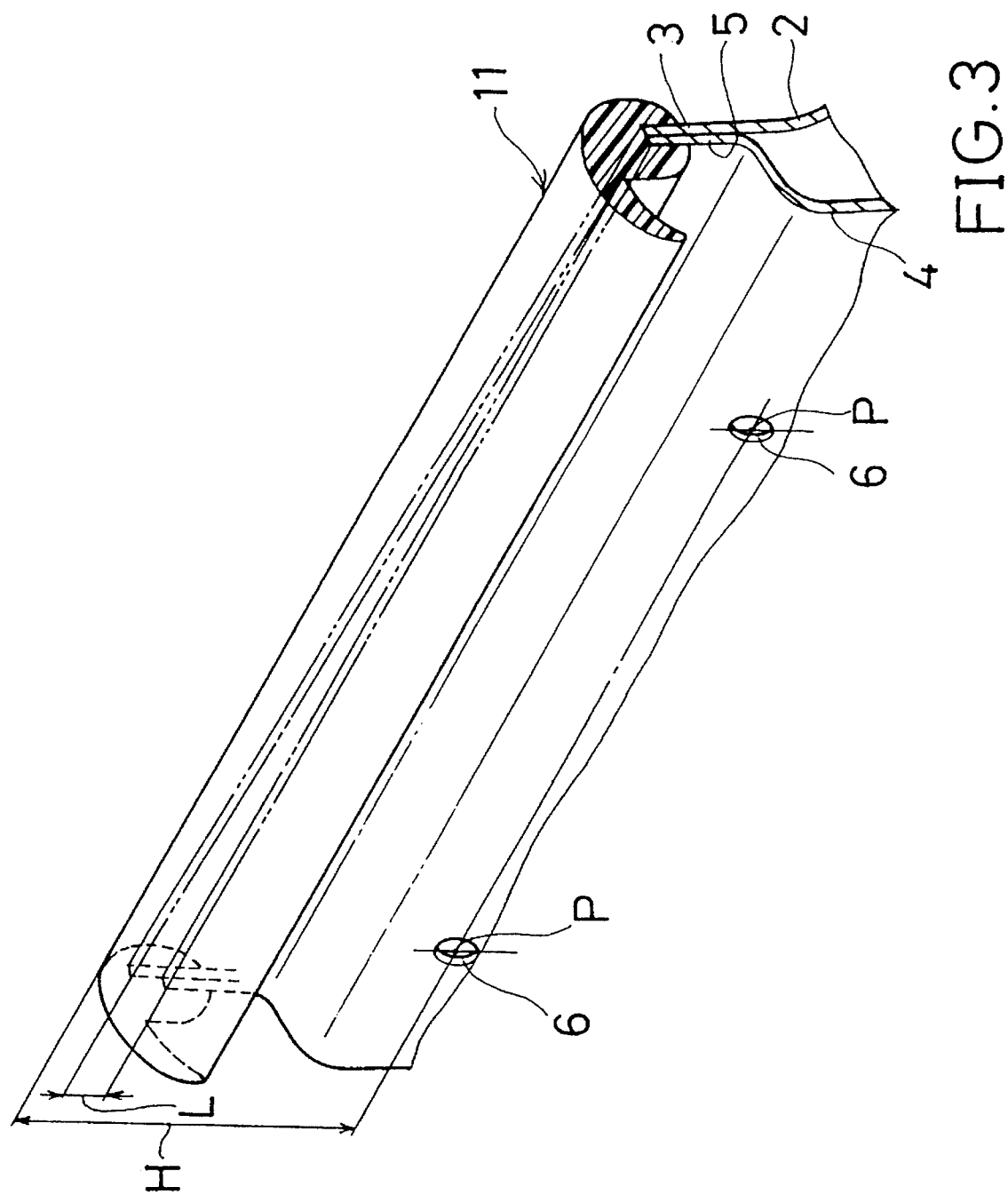
FIG. 3 is a perspective view in which the trim member is mounted on the upper ends of the joined flanges of the door panel of the first embodiment.

In the embodiment, .a panel is constructed as a composite door panel i for a vehicle, and as shown in FIG. 3, a first flange 3 formed on the upper edge of an inner panel 2 and a second flange 5 formed on the upper edge of an outer panel 4 are joined by spot welding. Then, a trim member 11 of synthetic resin, rubber or the like is extrusion molded on the upper ends of the joined first and second flanges 3 and 5 and is simultaneously mounted thereon in such a manner as to cover the upper ends.

Figure 1:
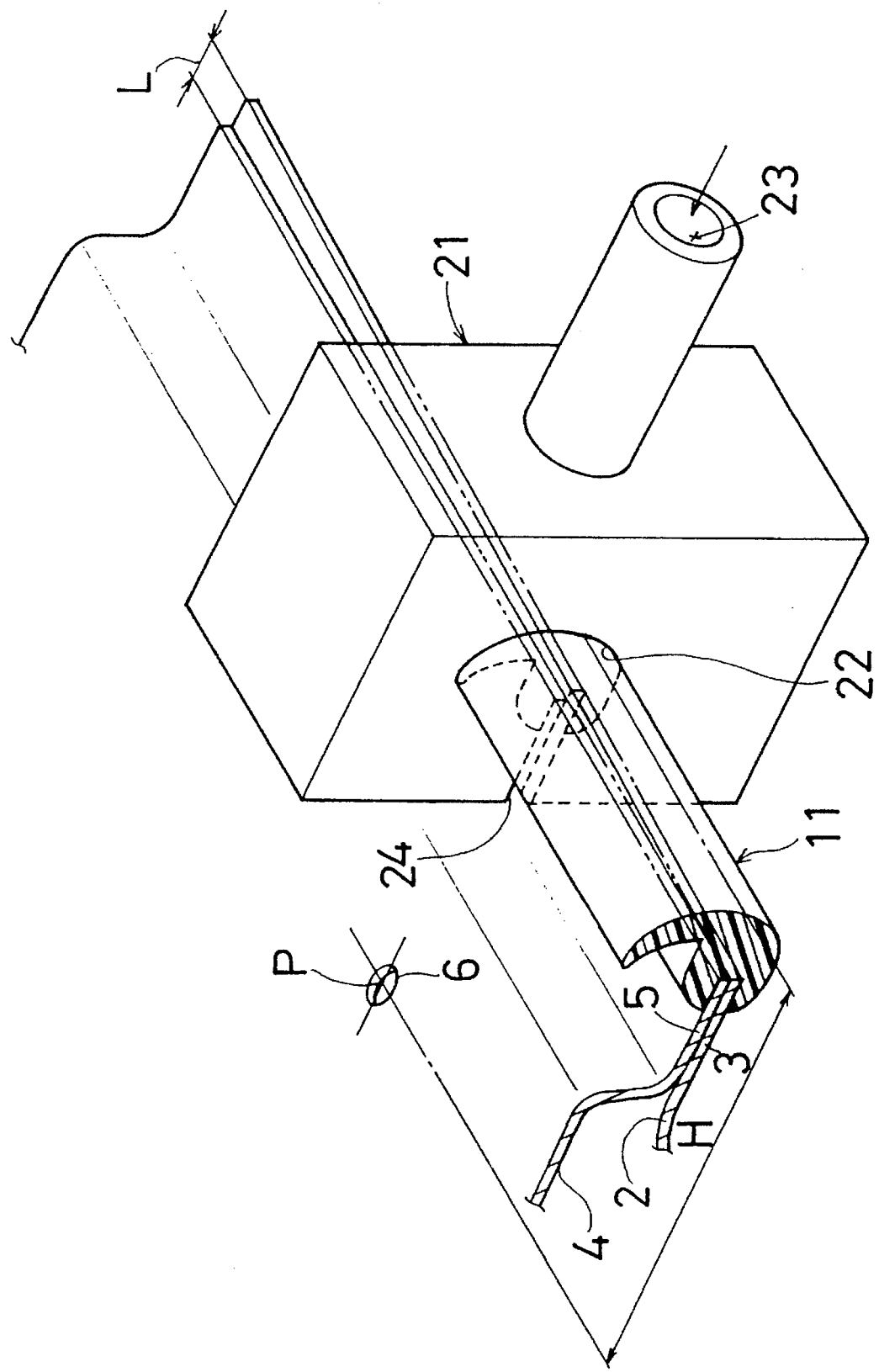
FIG. 1 is a perspective view of a first embodiment of the invention in which a trim member is extrusion molded and is simultaneously mounted on the edge of joined flanges of a door panel.
Figure 2:
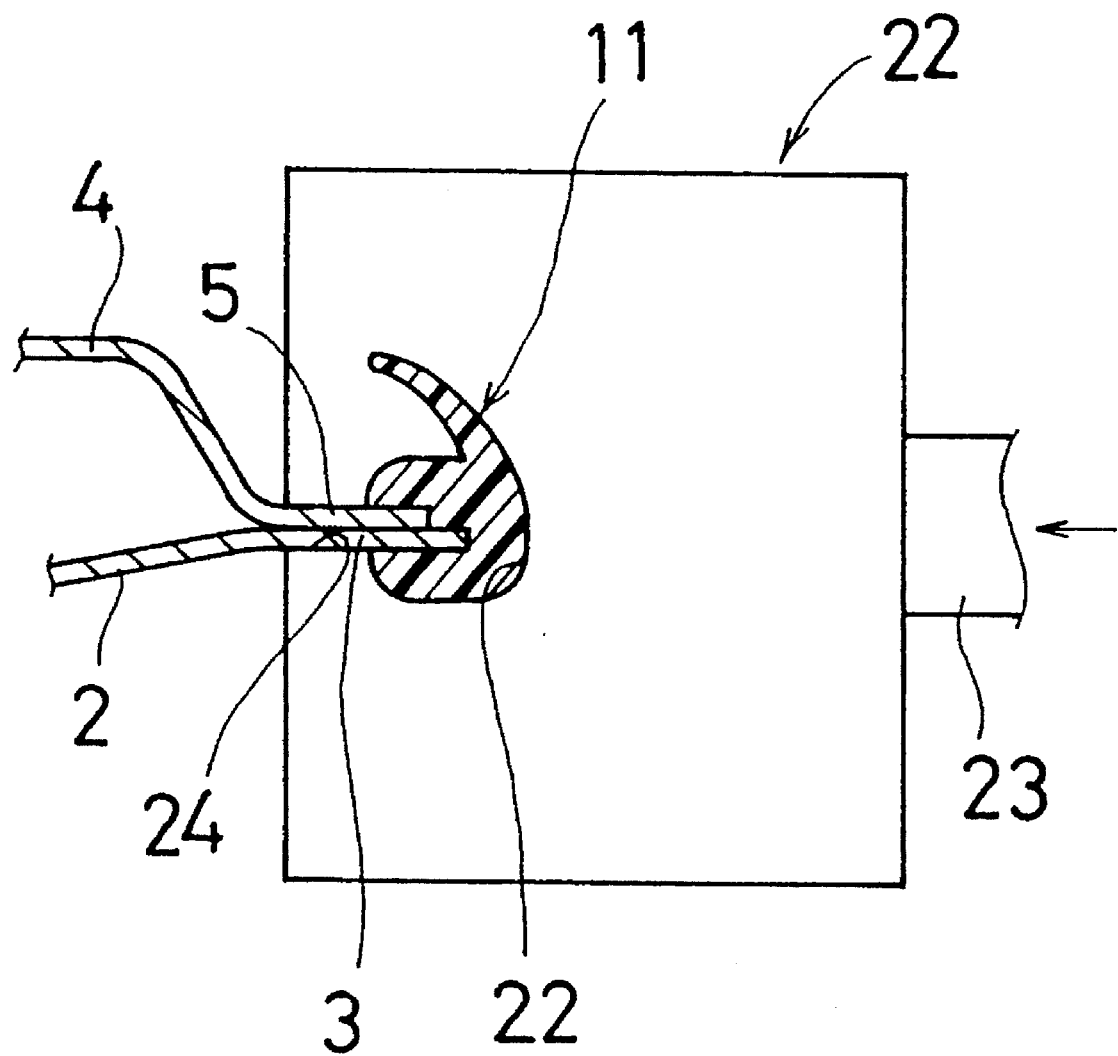
FIG. 2 is a front view of an extrusion molding die of the first embodiment.

As shown in FIGS. 1 and 2, a die 21 for extrusion molding the trim member 11 has an extrusion port 22 opening in the front face thereof and communicating with a molding material supply passage 23 which in turn communicates with an extruder.

Further, the die 21 has an insertion slit 24 communicating with the extrusion port 22 for inserting the joined flanges 3 and 5 thereinto. The insertion slit 24 extends from the front face to the rear face of the die 21. A molding space having a cross section corresponding to the trim member 11 is defined between the joined flanges 3 and 5 inserted through the insertion slit 24 into the extrusion port 22 and the inner peripheral surface of the extrusion port 22.

Further, the depth of insertion of the second flange 5 in the extrusion port 22 is set such that a distance between a reference position of the door panel 1, such as a center P of a through hole 6 formed through the outer panel 4, and the upper edge of the trim member 11 to be mounted on the upper end of the second flange 5 becomes a required distance H.

When the flanges 3 and 5 are inserted through the insertion slit 24 of the die 21 into the extrusion port 22, a molding material is extruded from the extruder through the material supply passage 23 and is supplied into the molding space to form the trim member 11 therein. The molded trim member 11 is then extruded forwardly of the extrusion port 22.

During extrusion molding of the trim member 11, the die 21 and the joined flanges 3 and 5 are moved relative to each other at a speed equal to the extruding speed of the molding material, while the depth of insertion of the second flange 5 in the extrusion port 22 is adjusted such that the distance H from the reference position of the outer panel 4 (the center P of the through hole 6) to the upper edge of the trim member 11 is maintained at a constant distance. Thus, the trim member 11 is continuously extrusion molded along the edge of the joined flanges 3 and 5 from one end thereof toward the other end and is simultaneously mounted on the edge of the joined flanges 3 and 5.

Figure 4A:
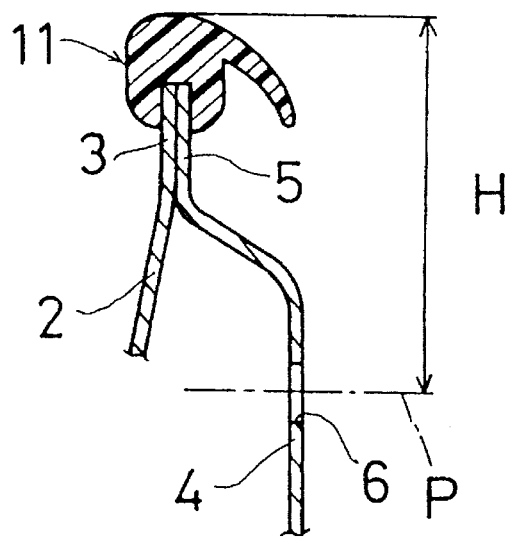
FIG. 4(A) is a sectional view in which the trim member is mounted on the flanges joined in a normal condition.
Figure 4B:
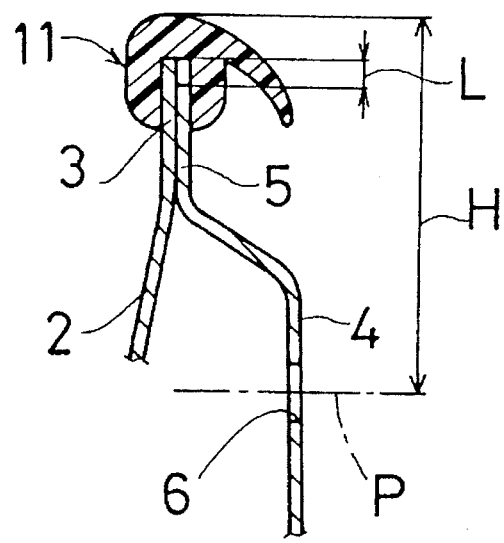
FIG. 4(B) is a sectional view in which the trim member is mounted on the flanges joined with their position shifted in a vertical direction.

By thus extrusion molding the trim member 11 along the edge of the joined flanges 3 and 5 of the door panel 1 and simultaneously mounting the trim member 11 thereon, even when the joined flanges 3 and 5 are joined with the amount L shifted in a vertical direction as shown in FIGS. 3, 4(A) and 4(B), the distance from the reference position of the outer panel 4 to the upper edge of the trim member 11 can be maintained at the required amount H. As a result, the trim member 11 can be mounted accurately on the edge of the joined flanges 3 and 5 and in a desired outer shape.

Figure 5:
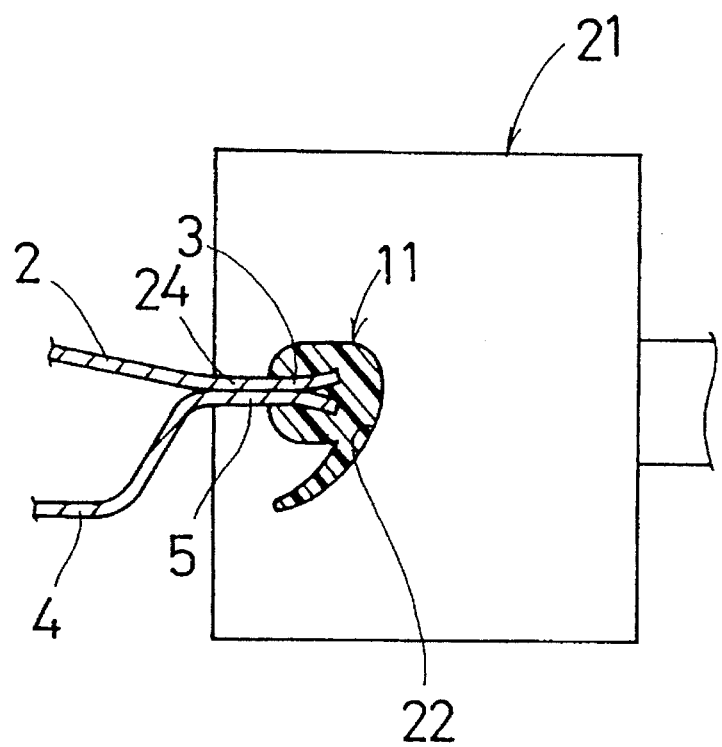
FIG. 5 is a perspective view in which the flanges are joined with their edges partly opened and the trim member is extrusion molded on such open edges.
Figure 6:
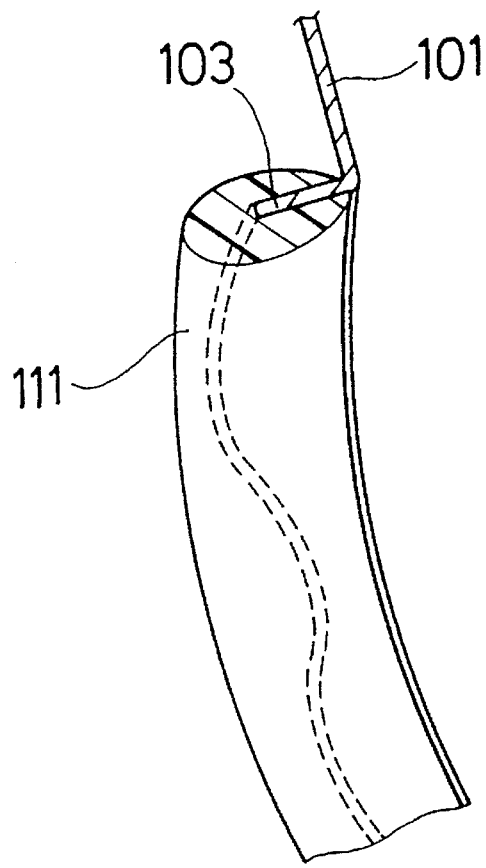
FIG. 6 is a perspective view in which a trim member is mounted on a flange of a wheel arch panel of a second embodiment.
Figures 7A, 7B, 7C:
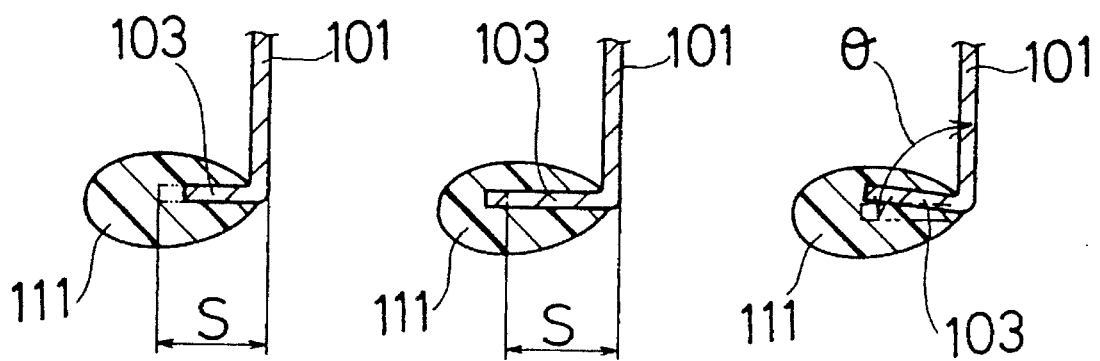
FIG. 7(A) is a sectional view in which the width of the flange of the second embodiment is shorter than a setting width and the trim member is mounted on the shorter part of the flange.
FIG. 7(B) is a sectional view in which the width of the flange of the second embodiment is longer than a setting width and the trim member is mounted on the longer part of the flange.
FIG. 7(C) is a sectional view in which the flange of the second embodiment is bent at an angle smaller than a setting angle and the trim member is mounted on the smaller-angle part of the flange.
Figure 8:
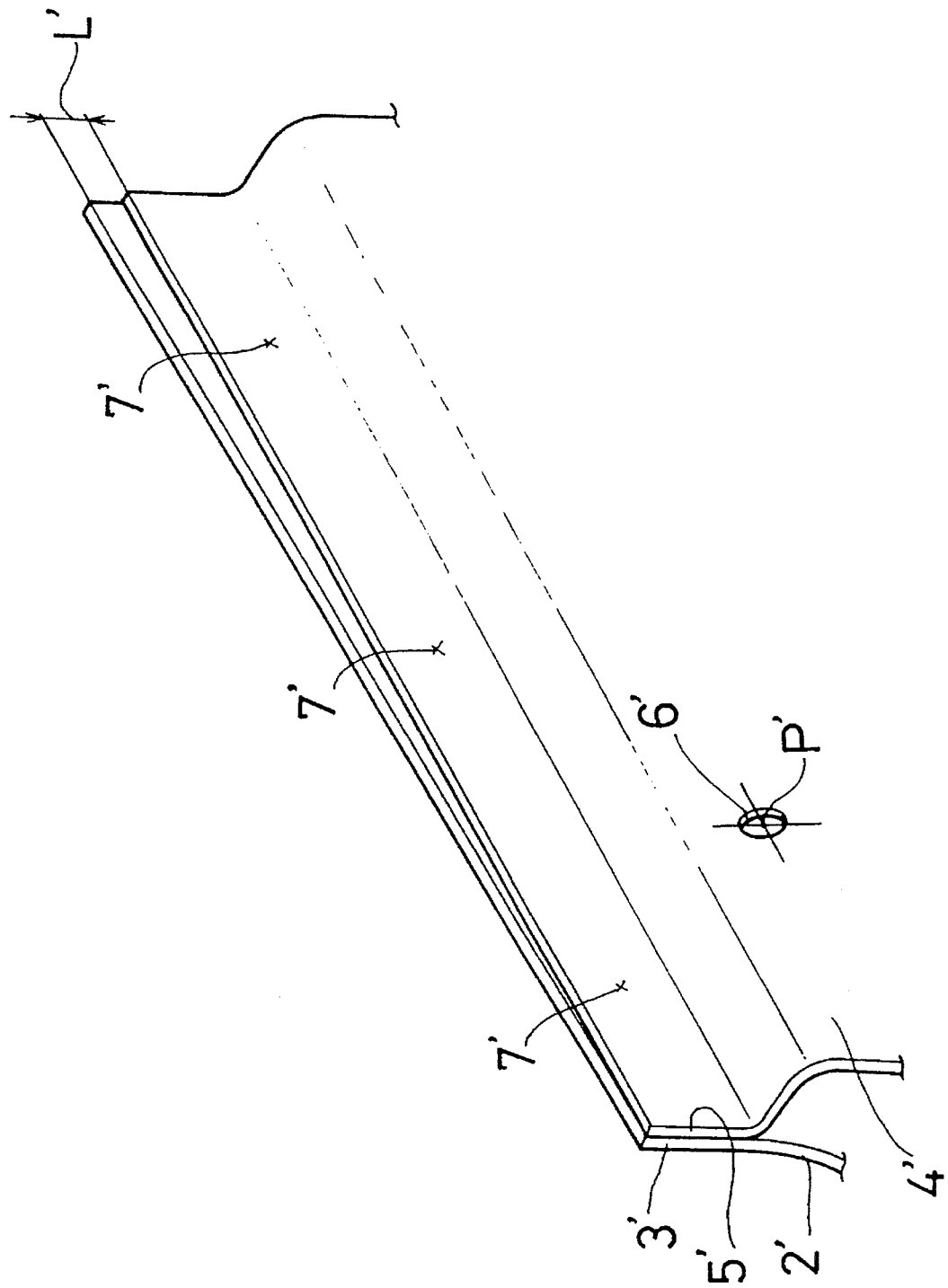
FIG. 8 is a perspective view in which flanges of a conventional door panel is joined with their position shifted in a vertical direction.
Figure 9A:
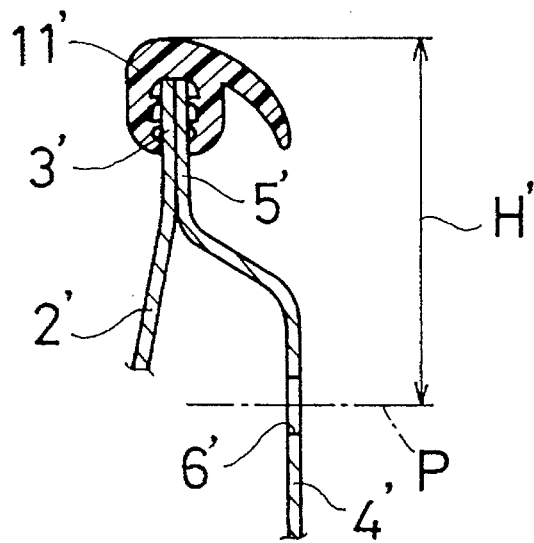
FIG. 9(A) is a sectional view in which the trim member is mounted on the flanges of the conventional door panel joined in a normal condition.
Figure 9B:
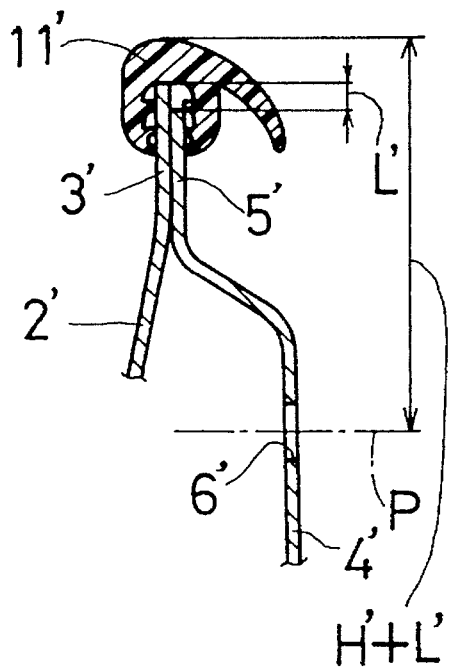
FIG. 9(B) is a sectional view in which the trim member is mounted on the flanges of the conventional door panel joined with their position shifted in a vertical direction.
Figure 10:
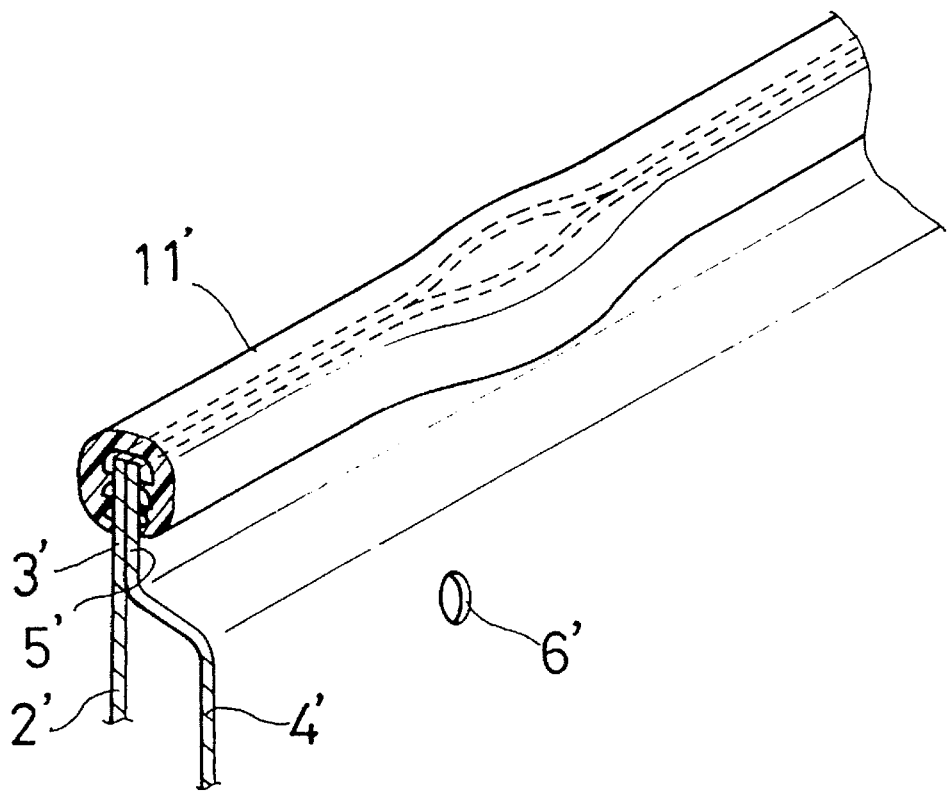
FIG. 10 is a perspective view in which the flanges of the conventional door panel are joined with their edges partly opened and the trim member is extrusion molded on such open edges.
Figure 11:
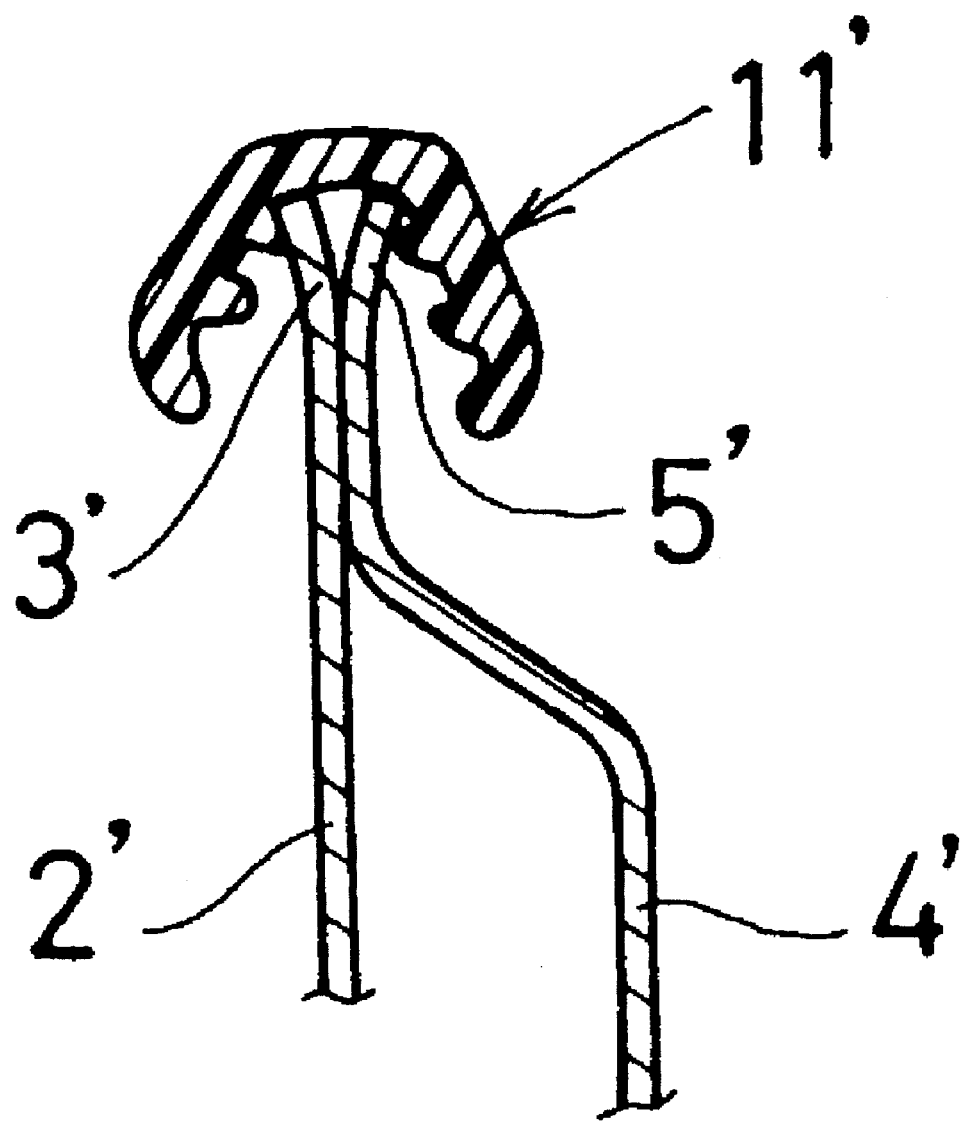
FIG. 11 is a sectional view of the prior art in which the trim member is mounted on the open edges of the flanges of the conventional door panel.
Figure 12:
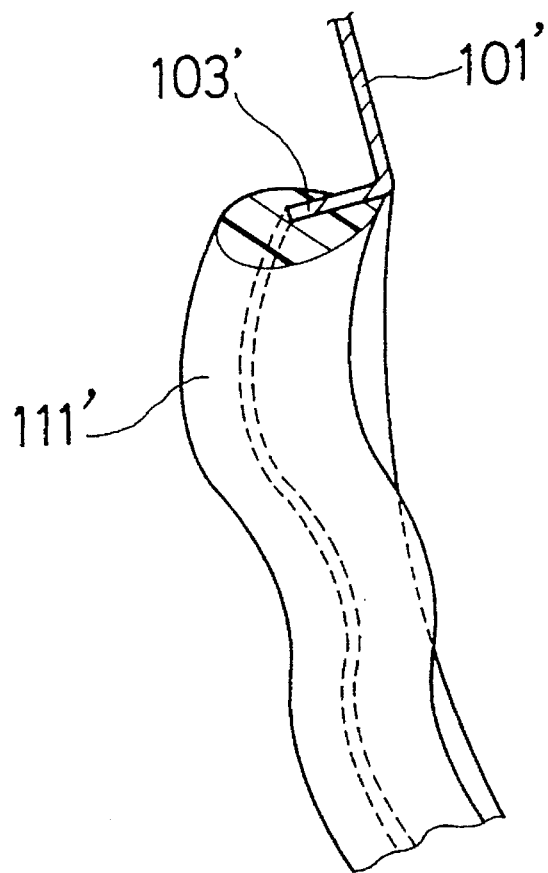
FIG. 12 is a perspective view in which the trim member is mounted on a flange of a conventional wheel arch panel.
Figures 13A, 13B, 13C:
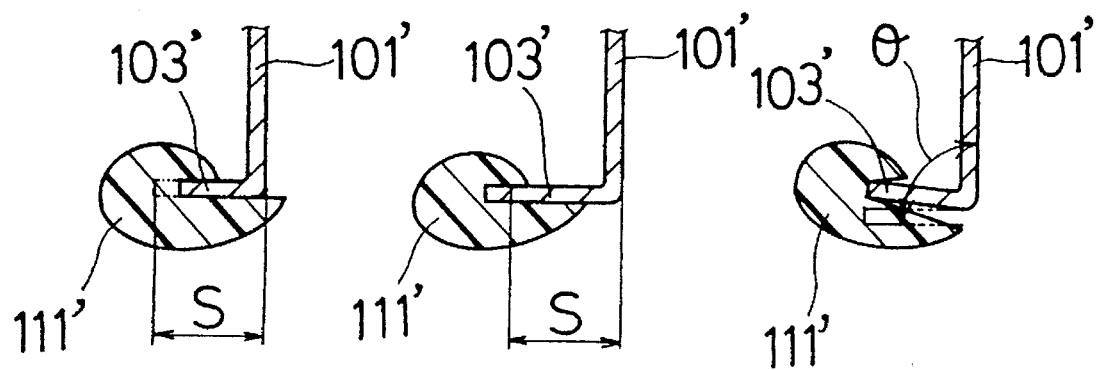
FIG. 13(A) is a sectional view in which the width of the flange of the conventional wheel arch panel is shorter than a setting width and the trim member is mounted on the shorter part of the flange.
FIG. 13(B) is a sectional view in which the width of the flange of the conventional wheel arch panel is longer than a setting width and the trim member is mounted on the longer part of the flange.
FIG. 13(C) is a sectional view in which the flange of the conventional wheel arch panel is bent at an angle smaller than a setting angle and the trim member is mounted on the smaller-angle part of the flange.

Further, even when the flange 3 of the inner panel 2 and the flange 5 of the outer panel 4 are joined with the upper ends partly opened, as shown in FIG. 5, the trim member 11 can be accurately mounted with a desired outer shape without being influenced by such partial opening, since the trim member 11 is extrusion molded on the edge of the joined flanges 3 and 5 and is simultaneously mounted thereon as described above.

Although the first embodiment employs the door panel 1 for a vehicle as the composite panel, the composite plate is not limited to the above.

Second Embodiment

Next, a second embodiment of the invention will be described with reference to FIGS. 6 and 7(A) to 7(C).

In the embodiment, a panel is constructed as a panel 101 forming a wheel arch section for a vehicle. The panel 101 has a flange 103 formed by press bending along the wheel arch section.

A trim member 111 of synthetic resin, rubber or the like is extrusion molded and simultaneously mounted on the flange 103 so as to cover the flange 103, in substantially the same manner as in the first embodiment.

In the second embodiment, the bend of the flange 103 of the panel 101 is taken as a reference position. During extrusion molding of the trim member 111, the die and the flange 103 are moved relative to each other with the angle of the panel surface to the die maintained at a required angle, while the depth of insertion of the flange 103 in the extrusion port of the die is adjusted such that the distance from the reference position to the upper edge of the trim member 111 is maintained at a required distance. Thus, the trim member 111 is continuously extrusion molded along the flange 103 and is simultaneously mounted thereon.

Thus, even when the distance from the bend to the edge of the flange 103 is longer or shorter than a setting distance S, or when the angle of bend of the flange 103 is larger or smaller than a setting angle 0, the trim member 111 can be mounted on the flange 103 with a good appearance and in a desired condition.

Although the second embodiment employs the panel 101 forming a wheel arch section for a vehicle as the panel, the plate is not limited to the above.

We claim:

1. A method of mounting a trim member on a flange of a panel, comprising the steps of:

preparing an extrusion molding die having a supply passage for supplying a molding material for a trim member, an extrusion port communicating with the supply passage and an insertion slit communicating with and extending laterally from the extrusion port for insertion of a flange of a panel;

inserting the flange into the extrusion port through the insertion slit, thereby defining between the extrusion port and the flange a molding space which has a cross section corresponding to the trim member;

extruding the molding material supplied through the material supply passage forwardly of the extrusion port through the molding space; and providing continuous relative movement of the molding die and the flange, while adjusting the amount of insertion of the flange into the extrusion port such that a distance from a reference position of the panel to an upper edge of the trim member is maintained at a predetermined distance.

2. A method of mounting a trim member on joined flanges of a composite panel comprised of a plurality of panel sheets, comprising the steps of:

preparing an extrusion molding die having a supply passage for supplying a molding material for a trim member, an extrusion port communicating with the supply passage and an insertion slit communicating with and extending laterally from the extrusion port for insertion of joined flanges of a composite panel;

inserting the joined flanges into the extrusion port through the insertion slit, thereby defining between the extrusion port and the flanges a molding space which has a cross section corresponding to the trim member;

extruding the molding material supplied through the material supply passage forwardly of the extrusion port through the molding space; and providing continuous relative movement of the molding die and the flanges, while adjusting the amount of insertion of the flanges into the extrusion port such that the distance from a reference position of the panel to an upper edge of the trim member is maintained at a predetermined distance.

* * * * *